(12) United States Patent
Walls et al.

(10) Patent No.: US 7,088,639 B2
(45) Date of Patent: Aug. 8, 2006

(54) METHOD FOR DETERMINING FORMATION QUALITY FACTOR FROM WELL LOG DATA AND ITS APPLICATION TO SEISMIC RESERVOIR CHARACTERIZATION

(75) Inventors: Joel Walls, Houston, TX (US); M. Turhan Taner, Houston, TX (US); Jack Dvorkin, Emerald Hills, CA (US)

(73) Assignee: RDSP I L.P., Houston, TX (US)

( * ) Notice: Subject to any disclaimer, the term of this patent is extended or adjusted under 35 U.S.C. 154(b) by 0 days.

(21) Appl. No.: 11/098,010

(22) Filed: Apr. 2, 2005

(65) Prior Publication Data

US 2006/0104158 A1 May 18, 2006

Related U.S. Application Data

(60) Provisional application No. 60/628,801, filed on Nov. 17, 2004.

(51) Int. Cl.
*G01V 1/28* (2006.01)
*G01V 1/00* (2006.01)

(52) U.S. Cl. .............................. 367/73; 367/38; 702/14

(58) Field of Classification Search ................. 367/38, 367/73; 702/11, 12, 13, 14
See application file for complete search history.

(56) References Cited

U.S. PATENT DOCUMENTS

| | | | | | |
|---|---|---|---|---|---|
| 4,969,130 | A | * | 11/1990 | Wason et al. ................... | 367/73 |
| 4,982,382 | A | * | 1/1991 | Dablain ......................... | 367/73 |
| 5,583,825 | A | * | 12/1996 | Carrazzone et al. ........... | 702/13 |
| 6,374,185 | B1 | * | 4/2002 | Taner et al. .................... | 367/73 |
| 2005/0055164 | A1 | * | 3/2005 | Neff et al. ...................... | 702/14 |

* cited by examiner

*Primary Examiner*—Ian J. Lobo
(74) *Attorney, Agent, or Firm*—Richard A. Fagin

(57) ABSTRACT

A method for seismic characterization of subsurface Earth formations includes determining at least one of compressional velocity and shear velocity, and determining reservoir parameters of subsurface Earth formations, at least including density, from data obtained from a wellbore penetrating the formations. A quality factor for the subsurface formations is calculated from the velocity, the density and the water saturation. A synthetic seismogram is calculated from the calculated quality factor and from the velocity and density. The synthetic seismogram is compared to a seismic survey made in the vicinity of the wellbore. At least one parameter is adjusted. The synthetic seismogram is recalculated using the adjusted parameter, and the adjusting, recalculating and comparing are repeated until a difference between the synthetic seismogram and the seismic survey falls below a selected threshold.

8 Claims, 2 Drawing Sheets

METHOD FOR DETERMINING FORMATION QUALITY FACTOR FROM WELL LOG DATA AND ITS APPLICATION TO SEISMIC RESERVOIR CHARACTERIZATION

CROSS-REFERENCE TO RELATED APPLICATIONS

Priority is claimed from U.S. Provisional Application No. 60/628,801 filed on Nov. 17, 2004.

STATEMENT REGARDING FEDERALLY SPONSORED RESEARCH OR DEVELOPMENT

The invention was made pursuant to contract no. DE-FC26-01BC15356 with the United States Department of Energy. The U.S. Government retains certain rights in the invention.

BACKGROUND OF THE INVENTION

1. Field of the Invention

The invention relates generally to the field of seismic data processing and interpretation. More specifically, the invention relates to methods for characterizing a hydrocarbon reservoir in the Earth's subsurface using synthetic seismic data adjusted for acoustic Quality factor (Q) determined from well log data.

2. Background Art

Seismic exploration techniques are used to locate subsurface earth formations that are likely to produce economically useful materials such as petroleum. Seismic exploration techniques include deploying one or more seismic energy sources near the earth's surface and deploying an array of seismic sensors at or near the surface in the vicinity of the one or more seismic sources. Seismic energy propagates downwardly from the source, where it may be reflected by subsurface acoustic impedance boundaries. The reflected seismic energy is detected by an array of sensors. The sensors generate electrical and/or optical signals corresponding to the detected seismic energy. The signals are typically recorded for processing.

Seismic processing known in the art includes determining structures of the subsurface earth formations. Typically, structures are inferred by analysis of the two-way travel time of the seismic energy from the source to the various reflective boundaries beneath the surface and back to the sensors at or near the surface.

It is also known in the art to determine various petrophysical properties of the subsurface earth formations by analysis of the frequency content of the detected seismic energy and the phase and amplitude relationships between the seismic energy generated by the source and the seismic energy detected by the sensors. Such analysis includes determining one or more seismic "attributes" of the earth formations. Attributes may be computed prestack or poststack. Prestack means processing prior to summing or "stacking" individual sensor recordings ("traces") according to a predetermined relationship, such as common mid point (CMP) or common depth point (CDP). Poststack refers to processing after individual sensor recordings have been summed or stacked. Poststack attributes include, for example, reflection intensity, instantaneous frequency, reflection heterogeneity, acoustic impedance, velocity, dip, depth and azimuth. Prestack attributes include moveout parameters such as amplitude-versus-offset (AVO), and interval and average velocities. Further, attributes may be categorized either as instantaneous attributes, wavelet attributes or geometrical attributes. Instantaneous attributes are attributes whose values are obtained for each data point in the seismic data or within a small time window of data points (e.g., a few milliseconds), such as amplitude, phase, frequency and power. "Data points" within seismic data typically refers to numbers each representing a value of seismic trace amplitude at the instant in time at which each of the amplitude values is recorded. Wavelet attributes are the instantaneous attributes computed at the maximum point of the envelope. The physical meaning of all the wavelet attributes is essentially the same as their instantaneous attribute counterparts. Geometrical, or interval, attributes are attributes of a seismic trace within a seismic interval. Interval attributes are computed from the reflection configuration and continuity. The following references describe aspects of seismic attributes and their applications.

U.S. Pat. No. 5,226,019 issued to Bahorich states that with reference to seismic attributes, "combining multiple (i.e. two or more) descriptors through addition, subtraction, multiplication and ratio, or other means can also be successfully employed", and suggests the use of "a product of the average instantaneous amplitude and average instantaneous frequency."

U.S. Pat. No. 5,884,229 issued to Matteucci, discloses a statistical method for quantitatively measuring the lateral continuity of the seismic reflection character of any specified location in a subsurface target formation.

U.S. Pat. No. 5,930,730 issued to Marfurt et al., discloses a system for forming a seismic attribute display from calculated measures of semblance and corresponding estimates of true dip and true dip azimuth of seismic traces within an analysis cell.

U.S. Pat. No. 6,012,018 issued to Hombuckle, relates to a system for identifying volumetric subterranean regions bounded by a surface in which a specific seismic characteristic has a constant value. It is stated in the '018 patent that, "in a geological region where physical characteristics (e.g., the presence of oil or gas) are well-correlated with seismic attributes, (e.g., seismic amplitude data), the identification of a subvolume bounded by a constant-seismic-attribute-value surface may provide a very useful predictor of the volumetric extent of the attribute and hence of the characteristic."

U.S. Pat. No. 5,001,677 issued to Masters, discloses a system, which treats measured attributes derived from seismic data as components of a vector, estimates a background vector representing typical background geologic strata, and then calculates a new attribute. As stated in the '677 patent, the preferred embodiment combines information about P (compressional) and S (shear) impedance contrasts so as to discriminate prospective reservoir strata from surrounding non-reservoir or background strata.

U.S. Pat. No. 5,724,309 issued to Higgs et al, discloses a system in which two new seismic attributes (dip magnitude and dip azimuth) are derived from instantaneous phase. The system comprises determining a spatial frequency value by taking the directional spatial derivative of the instantaneous phase for each of a plurality of x, y, t(z) data points in the seismic data and posting the spatial frequency values to identify changes within the earth's subsurface.

U.S. Pat. No. 5,870,691 issued to Partyka et al., discloses a method for processing seismic data to identify thin beds.

Quality factor (Q) is a measure of how earth formations attenuate and disperse acoustic (seismic) energy. Q has been used as a direct indicator of the presence of hydrocarbons, among other uses. Estimation of attenuation of pressure and shear waves is as important as the estimation of interval velocities in the field of seismic data interpretation. Estimates of attenuation of pressure and shear waves provide an additional perspective of the lithology (rock mineral composition) and reservoir characteristics (rock pore space fluid content, fluid composition, fluid pressure and rock permeability to fluid flow).

An important aspect of seismic survey analysis is characterization of subsurface fluid reservoirs in the Earth over a geographic area for which seismic survey data are available. Reservoir characterization is used in particular to estimate the distribution of fluid content and expected fluid flow properties within the geographic area, and within the various subsurface reservoirs within the area. The accuracy of such characterizations is typically improved when data relating to fluid content and subsurface rock properties are correlated to the seismic data. Such correlations include generation of synthetic seismograms from rock properties inferred from data such as can be obtained by "well logs" (data recorded from instruments lowered into a wellbore drilled through the various subsurface Earth formations). Well log data are used to infer rock mineral content, fractional volume of pore space (porosity) and fractional volume of the pore space filled with connate water and hydrocarbons, as well as an estimate of the density of such hydrocarbons. Methods known in the art for generating synthetic seismograms include estimates of reflection coefficients and placement of subsurface reflection boundaries with respect to depth in the Earth, such that an estimate of how a seismic trace made in the vicinity of the wellbore would appear can be made. Methods known in the art for generating synthetic seismograms from subsurface formation data, however, are not well suited to take into account the attenuation of seismic energy and the spatial distribution of such attenuation. As is known in the art, spatial distribution of seismic energy attenuation can influence analysis methods such as amplitude versus offset (AVO), in which presence of hydrocarbons can be inferred directly from seismic data.

There is a need for methods for generating synthetic seismograms which take into account the attenuation properties of the Earth formations, such that seismic reservoir characterization which makes use of such attenuation properties may be carried out in more precisely

SUMMARY OF THE INVENTION

One aspect of the invention is a method for seismic characterization of subsurface Earth formations. A method according to this aspect of the invention includes determining at least one of compressional velocity and shear velocity, and determining reservoir parameters including at least a density of subsurface Earth formations from data obtained from a wellbore penetrating the formations. A quality factor for the subsurface formations is calculated from the velocity, the density and the water saturation. A synthetic seismogram is calculated from the calculated quality factor and from the velocity and density. The synthetic seismogram is compared to a seismic survey made in the vicinity of the wellbore. At least one reservoir parameter is adjusted. The synthetic seismogram is recalculated using the adjusted parameter, and the adjusting, recalculating and comparing are repeated until a difference between the synthetic seismogram and the seismic survey falls below a selected threshold.

Another aspect of the invention is a computer program stored in a computer readable medium. The program has logic operable to cause a computer to perform the following. At least one of compressional velocity and shear velocity is determined, and reservoir parameters including at least density of subsurface Earth formations is determined from data obtained from a wellbore penetrating the formations. A quality factor for the subsurface formations is calculated from the velocity, the density and the water saturation. A synthetic seismogram is calculated from the calculated quality factor and from the velocity and density. The synthetic seismogram is compared to a seismic survey made in the vicinity of the wellbore. At least one reservoir parameter is adjusted.

The synthetic seismogram is recalculated using the adjusted parameter, and the adjusting, recalculating and comparing are repeated until a difference between the synthetic seismogram and the seismic survey falls below a selected threshold.

Other aspects and advantages of the invention will be apparent from the following description and the appended claims.

DETAILED DESCRIPTION

Figure 1:
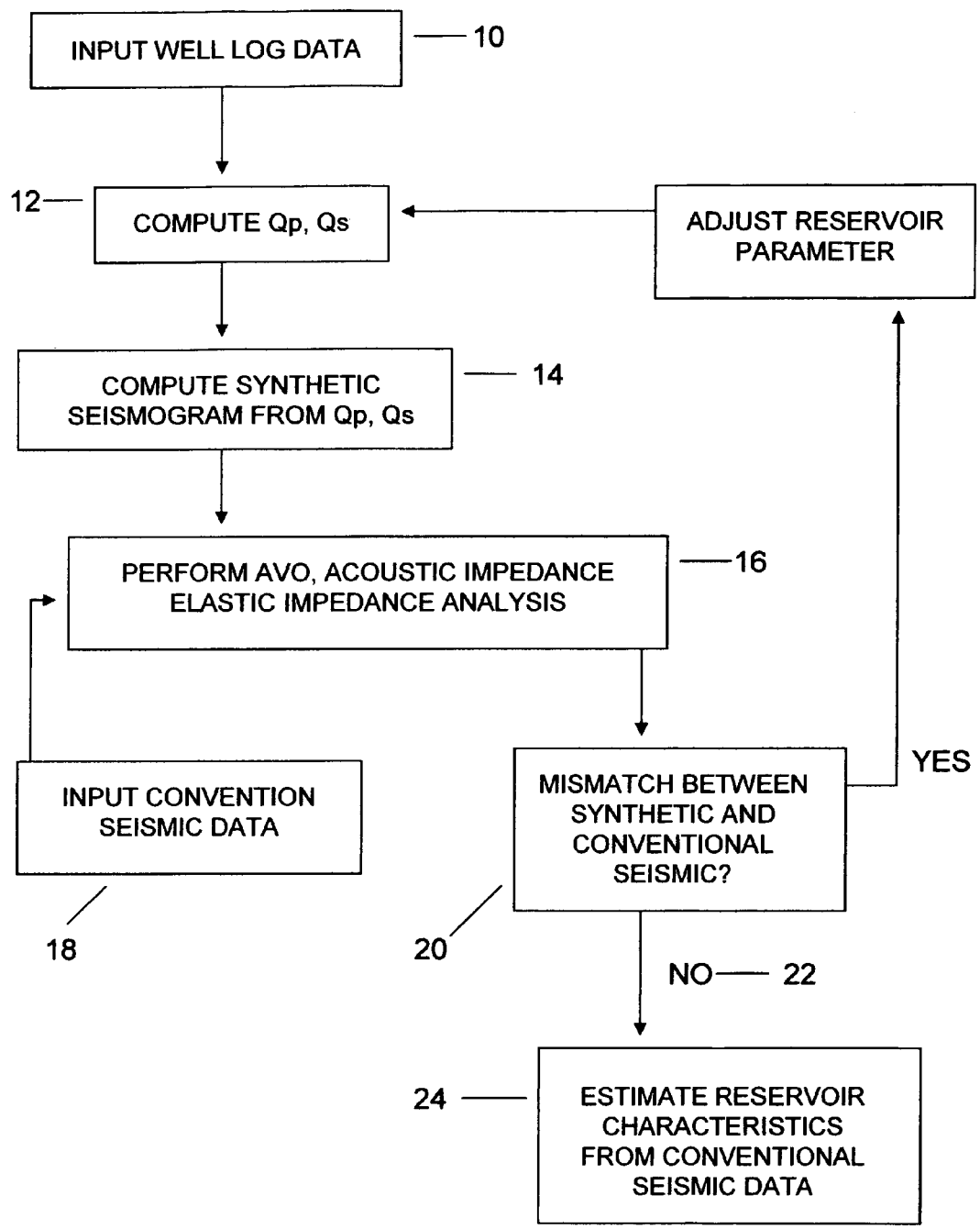
FIG. 1 shows a flow chart of an example process of one embodiment of the invention.

One embodiment of a method according to the invention is shown in a flow chart in FIG. 1. At 10, well log data, from a wellbore drilled through the subsurface Earth formations in the area of a seismic survey, are selected for interpretation. The well log data preferably include bulk density, compressional acoustic velocity and shear acoustic velocity. Other well log data may include measurements of a property corresponding to the fractional volume of clay mineral-based rock formation (generally referred to as "shave volume"), such as natural gamma radiation, thermal or epithermal neutron porosity, and measurements of a property which correlates to the fractional volume of the rock pore space filled with connate water (called "water saturation"), such measurements including, for example, electrical resistivity and thermal neutron capture cross section. The well log data are used to determine reservoir parameters, such as water saturation, mineral composition (lithology), fluid pressure, thickness and other physical characteristics of subsurface Earth formations, but at least the density of the formations. As is known in the art, the water saturation is typically inferred from the porosity and the resistivity (or thermal neutron capture cross section) using one or more empirical relationships.

At 12, quality factors for both compressional waves and shear waves (Qp, Qs) are calculated from the foregoing well log data and inferred properties for selected depth levels within the formations penetrated by the wellbore from within which the well log data were measured. At 14, the calculated Qp and Qs values are used to generate a synthetic seismogram. In the present embodiment, a synthetic seismogram may be generated both for normal incidence (wherein a seismic energy source and seismic receiver would have been positioned at the same position at the Earth's surface above the wellbore, and for various values of "offset" (lateral spacing between the wellbore location and the synthetic positions of the seismic source and seismic receiver)

At 16, the synthetic seismogram is used to perform AVO, and acoustic impedance analysis, using methods as if the seismic survey were one made from the Earth's surface in the conventional manner. At 18, a conventional seismic survey is compared to the synthetic seismic survey. At 20, to the extent there is any substantial mismatch between the AVO and acoustic impedance from the synthetic seismogram (at 16) and those from the actual seismic survey, at least one reservoir parameter, and the values of Qp, Qs determined at 12, and the computations performed therefrom, at 16, may be adjusted, and the calculations at 12 and 16 performed again. The foregoing process elements may be repeated until there is substantial agreement between the values calculated from the synthetic seismogram and the actual seismic survey. At 22, after the synthetic seismogram and the actual seismic survey calculations substantially match, at 24, the actual seismic survey may then be used to estimate subsurface reservoir characteristics over any selected subset of the area covered by the actual seismic survey, or the entire area covered by the actual seismic survey. Such analysis may be performed over subsets of the entire depth interval of the wellbore, over a selected time range within the seismic survey, or over the entire subsurface volume represented by the seismic survey.

Having explained in general terms the process by which a method according to the invention may be performed, an explanation of how to perform the various calculations explained with reference to FIG. 1 follows.

1. Calculating Q from Well Log Data

When an acoustic wave, such as may be emitted from a seismic energy source impacts an Earth formation having partially water filled pore space, the acoustic waves induce variations of pore fluid pressure in the form of oscillatory liquid flow. Viscous energy losses during this flow are responsible for wave attenuation. The same viscous effects determine changes in the dynamic bulk modulus of the system (rock mineral, and fluid filed pore space) with respect to the frequency of the acoustic energy. These changes are linked to attenuation via the causality condition. In methods according to the invention, the frequency dependence of the bulk modulus of a partially saturated rock is analytically quantified by assuming that fluid saturation is "patchy" (meaning that the water saturation changes between relatively large "patches" of substantially constant water saturation) and the changes in dynamic bulk modulus are then linked to the inverse of the quality factor (Q). As a result, compressional acoustic wave attenuation can be quantitatively linked to water saturation and thus can serve as a direct water saturation indicator from seismic data The frequency range of seismic energy used for illuminating subsurface Earth formation spans four orders of magnitude, from about $10^1$ (surface seismic surveys) Hz to about $10^4$ (acoustic well logging) Hz. Viscoelastic effects and attenuation may arise from the oscillatory liquid crossflow between fully-liquid-saturated patches and the surrounding rock with gas in the pore spaces. The main condition for fluid-related attenuation within in the above frequency range is the existence of such patches whose length scale is several orders of magnitude larger than the pore scale (FIG. 1).

To understand physical reasons for the existence of patchy saturation, consider a volume of rock that consists of several sandstone formation patches with clay mineral content slightly varying among them. The clay-content variations may have only a small effect on the dry elastic moduli of such formations but they typically substantially affect permeability and, therefore, capillary pressure relationships. In a state of capillary equilibrium, an elastically homogeneous volume may have a patchy saturation pattern. If capillary pressure is the same for adjacent patches whose capillary pressure relationships are different, such adjacent patches can have very different fluid saturations.

The size L of a continuous patch occupied solely by the liquid phase determines the effective bulk modulus of a partially water saturated rock at a fixed overall water saturation and frequency. If the patch is small such that, $$L < \sqrt{D/f}$$

wherein $D = kK_W/\phi\mu$ represents the diffusivity; k represents the permeability; $K_W$ represents the bulk modulus of the liquid; $\phi$ represents the porosity (fractional volume of pore space); and $\mu$ represents the dynamic viscosity of the liquid, or alternatively if the acoustic frequency is low, the wave-induced fluid pressure variations between the water saturated patch and surrounding gas-containing rock equilibrate during the wave period. The patch is thus considered to be "relaxed." It appears that a critical size L may be as small as 10 cm at a frequency of 50 Hz. The critical size is approximately the scale of heterogeneity in a subsurface reservoir required for viscoelastic effects and attenuation to become detectable at ordinary surface seismic frequencies.

If the patch size is smaller than L, then the acoustically induced pressure oscillations in the patch will quickly equilibrate with the surrounding gas-saturated region. As a result, the entire partially saturated region can be treated as homogeneously saturated with a liquid-gas mixture whose bulk modulus $K_F$ is the Reuss average of those of the liquid ($K_W$) and the gas ($K_G$) according to the expression:

$$\frac{1}{K_F} = \frac{S_W}{K_W} + \frac{1-S_W}{K_G}, \qquad (1)$$

where $S_W$ represents the water saturation (fractional amount of the total volume of the pore space that is completely filled with water). Then the bulk modulus of the partially saturated region $K_{Sat0}$ can be determined by Gassmann's equation:

$$K_{Sat0} = K_S \frac{\phi K_{Dry} - (1+\phi) K_F K_{Dry}/K_S + K_F}{(1-\phi) K_F + \phi K_S - K_F K_{Dry}/K_S}, \qquad (2)$$

where $K_{Dry}$ represents the bulk modulus of the dry frame of the rock; $K_S$ represents the bulk modulus of the mineral or matrix portion of the rock; and $\phi$ represents the porosity. The shear modulus of the partially saturated region $G_{Sat}$ is generally the same as that of the dry-rock frame $G_{Dry}$. If the patch is large, however, such that:

$$L > \sqrt{D/f}$$

or if the seismic energy frequency is high, the wave-induced fluid pressure variations in it will not equilibrate with the surrounding dry region during the wave period. The patch is thus unrelaxed. In such case the bulk modulus of the patch $K_P$ will appear to be the same as that of the fully liquid saturated rock, as shown in the following equation:

$$K_P = K_S \frac{\phi K_{Dry} - (1+\phi) K_W K_{Dry}/K_S + K_W}{(1-\phi) K_W + \phi K_S - K_W K_{Dry}/K_S}. \qquad (3)$$

Then the volumetric concentration of the fully saturated patches in the system is $S_W$ and the effective bulk modulus of the partially saturated region $K_{Sat\infty}$ is determined by the constant-shear-modulus equation:

$$\frac{1}{K_{Sat\infty}+(4/3)G_{Dry}} = \frac{S_W}{K_P+(4/3)G_{Dry}} + \frac{1-S_W}{K_{S_W=0}+(4/3)G_{Dry}}, \quad (4)$$

where $K_{S_W=0}$ is the bulk modulus of the gas-containing rock, determinable by Gassmann's equation, restated below:

$$K_{S_W=0} = K_S \frac{\phi K_{Dry} - (1+\phi) K_G K_{Dry}/K_S + K_G}{(1-\phi)K_G + \phi K_S - K_G K_{Dry}/K_S}. \quad (5)$$

$K_{S_W=0}$ (modulus when the pore space is completely filled with gas, or, water saturation equals zero) is very close to $K_{Dry}$ because gas is highly compressible If the size of the patch is fixed, and the seismic energy frequency is changing, the effective bulk modulus of partially saturated rock will vary between a low-frequency limit represented by $K_{Sat0}$ and a high-frequency limit represented by $K_{Sat\infty}$. The effective compressional modulus $M_{Sat}$ will vary between $M_{Sat0}$ and $M_{Sat\infty}$:

$$K_{Sat0} + \frac{4}{3}G_{Dry} = M_{Sat0} \le M_{Sat} \le M_{Sat\infty} = K_{Sat\infty} + \frac{4}{3}G_{Dry}. \quad (6)$$

The same approach can be used to describe the low- and high-frequency behavior of a patchy system if only P-wave (compressional) seismic data are available. The compressional modulus is the product of the bulk density and P-wave velocity squared. Specifically, the low-frequency compressional modulus $M_{Sat0}$ is determinable by the expression:

$$M_{Sat0} = M_S \frac{\phi M_{Dry} - (1+\phi) K_F M_{Dry}/M_S + K_F}{(1-\phi)K_F + \phi M_S - K_F M_{Dry}/M_S}, \quad (7)$$

in which $M_{Dry}$ represents the compressional modulus of the dry frame of the rock; and $M_S$ is the compressional modulus of the mineral or matrix portion of the rock formation.

The high-frequency limit $M_{Sat\infty}$ is given by Equation (4) which can be rewritten as:

$$\frac{1}{M_{Sat\infty}} = \frac{S_W}{M_P} + \frac{1-S_W}{M_{S_W=0}}, \quad (8)$$

where $$M_P = M_S \frac{\phi M_{Dry} - (1+\phi) K_W M_{Dry}/M_S + K_W}{(1-\phi)M_W + \phi M_S - K_W M_{Dry}/M_S} \quad (9)$$

and $$M_{S_W=0} = M_S \frac{\phi M_{Dry} - (1+\phi) K_G M_{Dry}/M_S + K_G}{(1-\phi)K_G + \phi M_S - K_G M_{Dry}/M_S}. \quad (10)$$

$M_{S_W=0}$ as previously explained, is very close to $M_{Dry}$ due to the high compressibility of gas. The difference between $M_{Sat0}$ and $M_{Sat\infty}$ has been empirically determined to be large at partial saturation, especially in the low-gas-saturation domain.

A curve described by Equation 8 is close to a straight line that connects the zero-saturation and full-saturation points. This means that $M_{Sat\infty}$ can be approximately modeled as a result of using a fictitious fluid whose bulk modulus is a linear combination of those of gas and water:

$$K_{FP} = S_W K_W + (1-S_W) K_G \quad (11)$$

in equation (11) the fluid can be substituted from Equations (2) or (7). Equation (9) does not describe a real physical entity resulting from mixing two pore fluid phases, rather, it is simply a convenient approximate (and physically deceptive) way of conducting patchy fluid substitution.

The range of water saturation is between 0 and 1. In reality, there is always an irreducible water saturation in a gas-containing reservoir (or any other porous reservoir that was at least partially filled with water). This simply means that patchy saturation pattern cannot exist at $S_W < S_{WIrr}$ and the deviation of the patchy saturation curve from the homogeneous saturation curve starts at some finite water saturation.

Consider a porous system where water saturation is at its minimum value $S_{WIrr}$. Add some water to this system to arrive at the overall reservoir water saturation $S_W > S_{WIrr}$. Assuming that all additional water is concentrated in fully water saturated patches that start to appear as soon as $S_W$ exceeds $S_{WIrr}$, then the volumetric concentration $f_P$ of these patches in the partially saturated system is calculated by:

$$f_P = \frac{S_W - S_{WIrr}}{1 - S_{WIrr}} \quad (12)$$

The bulk modulus of the fully saturated patch is given by Equation. (3). The bulk modulus $K_{S_W=S_{WIrr}}$ of the surrounding rock at $S_W = S_{WIrr}$ is given by Gassmann's equation $$K_{S_W=S_{WIrr}} = K_S \frac{\phi K_{Dry} - (1+\phi) K_{FIrr} K_{Dry}/K_S + K_{FIrr}}{(1-\phi)K_{FIrr} + \phi K_S - K_{FIrr} K_{Dry}/K_S} \quad (13)$$

where $K_{FIrr}$ is the bulk modulus of the homogeneous water/gas mixture at $$S_W = S_{WIrr} \quad (14)$$

$$\frac{1}{K_{FIrr}} = \frac{S_{WIrr}}{K_W} + \frac{1-S_{WIrr}}{K_G}$$

Then the bulk modulus of the system with patchy saturation at $S_W > S_{WIrr}$ is given by the constant-shear-modulus equation $$\frac{1}{K_{SatIrr\infty}+(4/3)G_{Dry}} = \frac{f_P}{K_P+(4/3)G_{Dry}} + \frac{1-f_P}{K_{S_W=S_{WIrr}}+(4/3)G_{Dry}} = \quad (15)$$

$$\frac{(S_W - S_{WIrr})/(1-S_{WIrr})}{K_P+(4/3)G_{Dry}} + \frac{(1-S_W)/(1-S_{WIrr})}{K_{S_W=S_{WIrr}}+(4/3)G_{Dry}}$$

The bulk modulus of the system at $S_W < S_{WIrr}$ is given by Equation (2).

The same approach can be used to calculate the compressional modulus of the system by the approximate P-only fluid substitution. The compressional modulus at $S_W < S_{WIrr}$ is given by Equation (7). For $S_W > S_{WIrr}$, the compressional modulus $M_{SatIrr\infty}$ in the system with patchy saturation is given by Equation (15) which is rewritten here as:

$$\frac{1}{M_{SatIrr\infty}} = \frac{(S_W - S_{WIrr})/(1 - S_{WIrr})}{M_P} + \frac{(1 - S_W)/(1 - S_{WIrr})}{M_{S_W = S_{WIrr}}} \quad (16)$$

where $M_P$ comes from Equation (9) and $M_{S_W=S_{WIrr}}$ is provided by the expression:

$$M_{S_W=S_{WIrr}} = M_S \frac{\phi M_{Dry} - (1+\phi)K_{FIrr}M_{Dry}/M_S + K_{FIrr}}{(1-\phi)K_{FIrr} + \phi M_S - K_{FIrr}M_{Dry}/M_S} \quad (17)$$

in which $K_{FIrr}$ given by Equation (14).

The resulting compressional modulus versus saturation relationship can be approximated by a line resulting from substituting a fictitious fluid mix into Gassmann's equation or the P-only fluid substitution equation for the compressional modulus. The bulk modulus of this fictitious mix is given by Equation (1) for $S_W < S_{WIrr}$ and by the expression:

$$K_{FPIrr} = \frac{S_W - S_{WIrr}}{1 - S_{WIrr}} K_W + \frac{1 - S_W}{1 - S_{WIrr}} K_{FIrr} \quad (18)$$

for $S_W > S_{WIrr}$, where $K_{FIrr}$ represents the bulk modulus of the homogeneous gas/water mix at $S_W = S_{WIrr}$, as given by Equation (14).

The difference between the elastic moduli calculated using the homogeneous and patchy saturation equations is, in essence, the difference between the low-frequency and high-frequency values of the elastic moduli. The effect of the apparent elastic moduli increase with increasing frequency is called the modulus-frequency dispersion (or the velocity-frequency dispersion, if considering the elastic-wave velocity instead of the elastic moduli). It should be restated here that the foregoing analysis for the modulus-frequency dispersion in the acoustic frequency range includes seismic and sonic well logging frequencies. As a result, ultrasonic frequency dispersion effects related to the microscopic squirt flow and the Biot mechanisms are not considered as part of the analysis The transition between the lower (homogeneous saturation) response and the upper (patchy) response is the transition between the low and high frequency responses. The corresponding elastic modulus dispersion is necessarily accompanied by absorption, according to the Kramer-Kronig relation for linear viscoelastic systems. To quantify this absorption, one needs to identify the frequency variation range (e.g., the low-frequency limit is at about 10 Hz and the high-frequency limit is at about 10 kHz) and also to know how the elastic modulus evolves as it changes between its low-frequency and its high-frequency values.

Two basic viscoelastic models give examples of linking attenuation to modulus-frequency dispersion. According to the standard linear solid (SLS) model, the elastic modulus M is related to frequency f as $$M(f) = \frac{M_0 M_\infty [1 + (f/f_{CR})^2]}{M_\infty + M_0 (f/f_{CR})^2}, \quad (19)$$

where $M_0$ is the low-frequency modulus limit; $M_{2\infty}$ is the high-frequency modulus limit; and $f_{CR}$ is the critical frequency at which the transition occurs from the low-frequency to the high-frequency modulus limit. The corresponding inverse quality factor is provided by the expression $$\frac{1}{Q} = \frac{(M_\infty - M_0)(f/f_{CR})}{\sqrt{M_0 M_\infty}[1 + (f/f_{CR})^2]}. \quad (20)$$

The maximum attenuation occurs at $f=f_{CR}$ and is determined by the expression $$\left(\frac{1}{Q}\right)_{max} = \frac{M_\infty - M_0}{2\sqrt{M_0 M_\infty}}. \quad (21)$$

As a practical matter, Equation (21) is used to calculate Qp from the parameters explained above, all of which may be estimated or determined from well log data, among other sources of data.

2. Generating Synthetic Seismograms Which Account for Q

Having explained how to use well log data to calculate Q for Earth formations from well log data, a process for generating synthetic seismograms which account for Q will now be explained.

Most seismic survey data analysis assumes an isotropic, linear, elastic Earth. Materials are considered to be linear-elastic when the stress applied to the material is proportional to strain undergone by the material. For elastic materials an expression can be written:

$$\sigma_{ij} = \lambda \delta_{ij} \epsilon_{\alpha\alpha} + 2\mu \epsilon_{ij} \quad (22)$$

where $\sigma_{ij}, \epsilon_{ij}$ represent the individual components of stress and strain, $\lambda, \mu$ represent the elastic constants, $\delta_{ij}$ represents the Kronecker delta, and $\epsilon_{\alpha\alpha} = \epsilon_{11} + \epsilon_{22} + \epsilon_{33}$ is the volumetric strain or dilatation. For the case of shear stress and shear strain, the foregoing expression becomes:

$$\sigma_{ij} = 2\mu \epsilon_{ij}, i \neq j \quad (23)$$

wherein $\mu$ represents the shear modulus. In an elastic material, the relationship between stress and strain does not depend on history or rate. No real material strictly satisfies this requirement of elasticity.

Linear viscoelastic materials also depend on stress-strain rate or history. It is possible to adjust or "patch" the linear elastic stress-strain relationship to include these rate effects, by adding terms to the relationship that depend on the time derivatives of stress and strain. For example, shear stress and shear strain could be related using one of the following simple models:

$$\dot{\epsilon}_{ij} = \frac{\dot{\sigma}_{ij}}{2\mu} + \frac{\sigma_{ij}}{2\eta}, i \neq j \text{ for a Maxwell solid} \quad (24)$$

$$\sigma_{ij} = 2\eta \dot{\epsilon}_{ij} + 2\mu \epsilon_{ij}, i \neq j \text{ for a Voigt solid} \quad (25)$$

$$\eta \dot{\sigma}_{ij} + (E_1 + E_2) \sigma_{ij} = E_2 (\eta \dot{\epsilon}_{ij} + E_1 \epsilon_{ij}) \text{ for a standard linear solid} \quad (26)$$

where $E_1$ and $E_2$ are additional elastic moduli, and $\eta$ is a material constant similar in nature to viscosity. In the Fourier domain, the stress-strain relationship for a viscoelastic material can be expressed as:

$$\tilde{\sigma}(\omega) = M(\omega) \tilde{\epsilon}(\omega) \quad (27)$$

where $M(\omega)$ represents the frequency-dependent complex modulus.

It is important to note that there are a number of functional forms that can describe physically realizable viscoelastic materials. The three foregoing examples are intended only to illustrate the principle and are not intended to limit the scope of the invention The quality factor, Q, is a measure of how dissipative the material is. The lower the Q, the larger the dissipation. When Q becomes infinity, the material is elastic. There are several ways to express Q. One precise way is as the ratio of the imaginary and real parts of the complex modulus:

$$\frac{1}{Q} = \frac{M_I}{M_R}. \tag{28}$$

Alternatively, Q can be expressed in terms of energies:

$$\frac{1}{Q} = \frac{\Delta W}{2\pi W} \tag{29}$$

where $\Delta W$ represents the energy dissipated per cycle of oscillation and W is the peak strain energy during the cycle.

For linear viscoelastic systems, causality requires that there be a very specific relation between velocity or modulus dispersion and Q. That is, if the dispersion is completely characterized for all frequencies, then Q is known for all frequencies, and vice versa. In the Fourier domain the stress-strain relationship can be written:

$$\tilde{\sigma}(\omega) = M(\omega)\tilde{\epsilon}(\omega) \tag{30}$$

where $M(\omega)$ represents the frequency-dependent complex modulus. For the material to be causal, the real and imaginary parts of $M(\omega)/(i\omega)$ must be Hilbert transform pairs as in the following expressions:

$$M_I(\omega) = \frac{\omega}{\pi} \int_{-\infty}^{+\infty} \frac{M_R(\alpha) - M_R(0)}{\alpha} \frac{d\alpha}{\alpha - \omega} \tag{31}$$

$$M_R(\omega) - M_R(0) = -\frac{\omega}{\pi} \int_{-\infty}^{+\infty} \frac{M_I(\alpha)}{\alpha} \frac{d\alpha}{\alpha - \omega} \tag{32}$$

where $M_R(0)$ is the real part of the modulus at zero frequency, which results because there is an instantaneous elastic response of a viscoelastic material. If we this is expressed in terms of Q:

$$Q^{-1} = \frac{M_I(\omega) \, sgn(\omega)}{M_R(\omega)} \tag{33}$$

then the following expression applies:

$$Q^{-1}(\omega) = \frac{|\omega|}{\pi M_R(\omega)} \int_{-\infty}^{+\infty} \frac{M_R(\alpha) - M_R(0)}{\alpha} \frac{d\alpha}{\alpha - \omega} \tag{34}$$

and its inverse:

$$M_R(\omega) - M_R(0) = \frac{-\omega}{\pi} \int_{-\infty}^{+\infty} \frac{Q^{-1}(\alpha) M_R(\alpha)}{|\alpha|} \frac{d\alpha}{(\alpha - \omega)} \tag{35}$$

The foregoing expressions provide the expected result that a larger attenuation generally is associated with larger dispersion. Zero attenuation requires zero velocity dispersion. The foregoing are known as the Kramers-Kronig relations.

For purposes of seismogram computation, the Kramers-Kronig relationships specify how acoustic velocity depends on Q, and also how the frequency-dependence of Q is related to the frequency dependence of the acoustic velocity.

The Kennett Algorithm uses an invariant imbedding method to recursively generate the seismic response of a layered medium by adding one layer at a time. The overall reflection and transmission matrices, $\hat{R}_D$ and $\hat{T}_D$ respectively, for downgoing seismic waves through a number of layers of Earth formations are given by the following recursion relations:

$$\hat{R}_D^{(k)} = R_D^{(k)} + T_U^{(k)} E_D^{(k)} \hat{R}_D^{(k+1)} E_D^{(k)} \left[I - R_U^{(k)} E_D^{(k)} \hat{R}_D^{(k+1)} E_D^{(k)}\right]^{-1} T_D^{(k)} \tag{36}$$

$$\hat{T}_D^{(k)} = \hat{T}_D^{(k+1)} E_D^{(k)} \left[I - R_U^{(k)} E_D^{(k)} \hat{R}_D^{(k+1)} E_D^{(k)}\right]^{-1} T_D^{(k)} \tag{37}$$

where $R_D^{(k)}$, $T_D^{(k)}$, $R_U^{(k)}$, and $T_U^{(k)}$ represent the single-interface downward and upward reflection and transmission matrices for the k-th interface (boundary between two adjacent formation layers).

The elastic Kennett algorithm can be adapted to simulate wave propagation in a viscoelastic (attenuating) layered set of Earth formations by replacing the velocities in each model layer with complex velocities. For example, the velocity (or modulus) can be perturbed by adding a small imaginary part, such as:

$$M = M_R(1 - iQ^{-1}) \tag{38}$$

which is consistent with the previously stated definition of Q:

$$\frac{1}{Q} = \frac{M_I}{M_R}$$

For values of Q of about 15 or greater, this can be expressed in terms of velocities as:

$$V \approx V\left(1 - i\frac{Q^{-1}}{2}\right) \tag{39}$$

Q can thus be included into the generation of synthetic seismograms relatively easily without making any changes to the elastic Kennett algorithm. The real elastic velocities are replaced in the Earth model with complex (frequency-independent) velocities—that is, the input model is changed. This will yield some of the expected physical results in the computed seismogram: a decrease in wave amplitude with propagation, stretching of the wavelets, and spectral decay. For large values of Q (>100), reasonable and acceptable results are generally obtained. However, the approximate simulation of wave propagation using frequency-independent velocities will violate the causality condition. As discussed earlier, causality requires a very specific relation between frequency-dependent velocity or modulus and Q, as specified by the Kramers-Kronig relationships. Therefore, a preferable way to model wave propagation in viscoelastic media is to modify the Kennett algorithm to allow for causal, frequency-dependent complex velocity functions. Because the Kennett algorithm is computed in the frequency domain, it is fairly straightforward to implement Q.

When choosing a causal velocity function, there can be an infinite number of choices, that is, there are infinite number of Hilbert transform pairs that will allow the real and imaginary parts of the complex, frequency-dependent modulus to satisfy the Kramers-Kronig relation. One choice is the standard linear solid, mentioned earlier. The standard linear solid gives the narrowest possible frequency band of high attenuation—the most frequency-dependent Q. At the other extreme is the Constant Q model, in which there is no variation of Q with frequency. It is believed that the nearly constant Q models are reasonable choices, especially considering that seismic data are fairly narrow band.

For seismogram generation, one specific relationship between frequency-dependent velocity and Q that preserves causality is:

$$V_p(\omega) = V_p\left(1 - i\frac{sgn\omega}{2Q(\omega)}\right) \quad (40)$$

$$Q(\omega) = Q_o\left(1 - \frac{\ln\left(\frac{\gamma\omega}{\omega_o}\right)}{\pi Q_o}\right) \quad (41)$$

This corresponds to a slowly varying (nearly constant) Q vs. frequency function.

Another specific relationship between frequency-dependent velocity and Q that preserves causality is:

$$V_p(\omega) = V_p(\omega_0)\left(1 - i\frac{sgn\omega}{2Q(\omega)} + \frac{1}{\pi Q}\ln(\omega/\omega_0)\right) \quad (42)$$

$$Q(\omega) = Q_o\left(1 - \frac{\ln\left(\frac{\gamma\omega}{\omega_o}\right)}{\pi Q_o}\right) \quad (43)$$

Synthetic common depth point (CDP) trace gathers can be generated using ray tracing in a 1-D (layered) Earth model. The synthetic CDP process begins by shooting a fan of seismic energy rays from the Earth's surface (depth=0). One implementation shoots 25 rays, spanning incidence angles to reflective horizons from zero to about 50 degrees at the Earth's surface, equally spaced in incidence angle Each of these rays is traced downward through the layered model: Angles are computed using Snell's law, then horizontal distance and travel times, for each ray in each layer are computed via ray tracing.

After the basic kinematics are computed by ray tracing in the layered model, the input model can be converted to equal sample intervals in time, before generating reflectivities. The time intervals are set equal to the time interval of the input seismic wavelet. This obviously resamples the Earth formation model. The ray tracing times, horizontal distance of propagation, and ray angles are all computed on the original input model, and only the reflectivities are computed after resampling to time. Resampling is done carefully—if layers are thin, then there is first oversampling to at least one sample per layer, then velocities are averaged using Backus, and density and angles are averaged linearly back to the wavelet sample interval.

Reflectivities are computed on the time-resampled model using Zoeppritz equation, and the seismic trace comes from convolving the reflectivity sequence with the wavelet. Reflectivities are computed at the desired offsets by interpolating angles and times from the fan of rays. Reflectivities and transmission coefficients are computed using full Zoeppritz.

Two reflectivity sequences are computed: one with moveout and the other without. Then convolution with the wavelet creates the traces. Hence, there is no NMO stretch.

3. Reservoir Characterization Using Q-Adjusted Synthetic Seismograms

After computation of a synthetic seismogram, conventional seismic analysis, including AVO, and acoustic impedance analysis can be performed. In a method according to the invention, an actual seismic survey is then compared to the synthetic seismogram determined using Q from well log data as explained above. Using any form of inversion process known in the art, the layered Earth formation model which is generated from well logs and converted into a layered model including layer thicknesses, velocities and Q values, is then perturbed. Perturbation may include changes to any of the model parameters, including the velocities, Q values and thicknesses. The model may even be perturbed laterally with respect to one or more of the parameters. After perturbation of the model, the synthetic seismogram is recalculated, and the synthetic seismogram is compared to the actual seismic survey. The process of model perturbation, recalculation of synthetic seismic, and comparison to the actual seismic is repeated until differences between the synthetic seismogram and the actual seismic survey reach a minimum, or fall below a selected threshold. Reservoir characteristics may then be inferred with respect to every modeled position within the synthetic seismic survey using conventional seismic interpretation techniques for estimating reservoir properties, including rock mineral properties, fractional volume of pore space, and fluid content of the reservoir.

Figure 2:
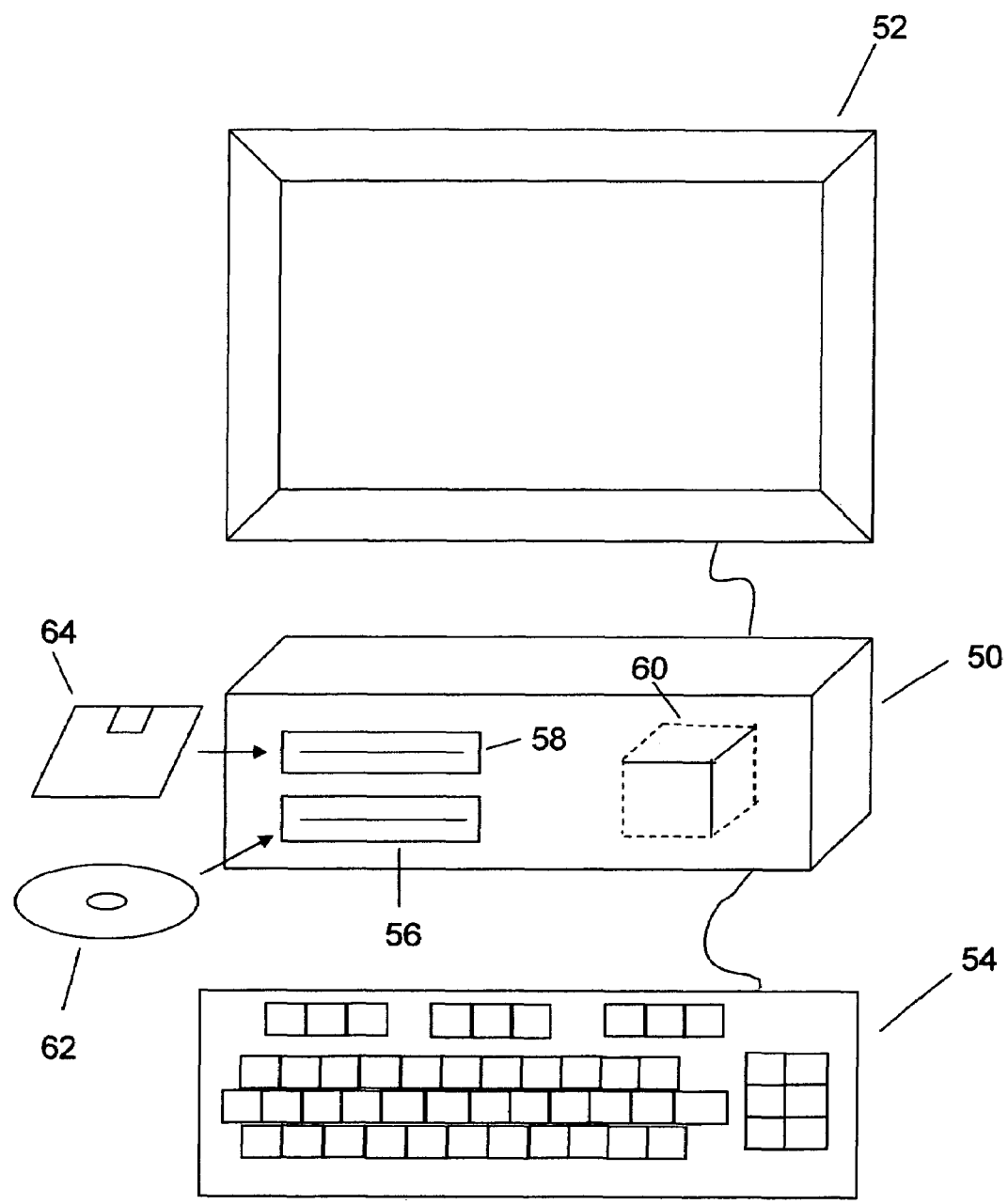
FIG. 2 shows a general purpose, programmable computer adapted to read stored logic operable to cause the computer to perform methods according to the invention.

The foregoing embodiments of methods according to the various aspects of the invention may be performed by a suitably programmed general purpose computer. An example of such a computer is shown in FIG. 2 having a central processor 50. The processor 50 is coupled to a user input device 54 such as a keyboard, and is coupled to a display 52 such as a cathode ray tube (CRT) or flat panel liquid crystal display (LCD). A computer program according to this aspect of the invention may reside on any one of a number of types of computer readable medium, such as compact disk 62 insertable into a CD reader 56, magnetic "floppy" disk 64 insertable into a floppy disk drive 58, or the program may reside in a hard drive 60 within or remote from the processor 50. The program includes logic operable to cause a programmable computer to perform the data processing sequences described above with respect to FIG. 1. The particular embodiment in which a computer program is stored is not meant to limit the scope of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer program stored in a computer readable medium, the program having logic operable to cause a computer to perform:
   determining at least one of compressional velocity and shear velocity, determining reservoir parameters including at least density of subsurface Earth formations from data obtained from a wellbore penetrating the formations;
   calculating quality factor for the subsurface formations from the velocity, the density and water saturation;
   calculating a synthetic seismogram from the calculated quality factor and from the velocity and density;
   comparing the synthetic seismogram to a seismic survey made in the vicinity of the wellbore;
   adjusting at least one reservoir parameter;
   recalculating the synthetic seismogram; and
   repeating the calculating quality factor, calculating a synthetic seismogram, comparing, adjusting and recalculating until a difference between the synthetic seismogram and the seismic survey falls below a selected threshold.

2. The program of claim 1 further comprising logic operable to cause the computer to perform estimating, from the seismic survey, at least one property of the subsurface Earth formations at a different location than the location of the wellbore.

3. The program of claim 2 wherein the at least one property comprises at least one of water saturation, fractional volume of pore space and mineral composition.

4. The program of claim 3 wherein the water saturation is determined using measurements of formation resistivity.

5. A method for seismic characterization of subsurface Earth formations, comprising:
   determining at least one of compressional velocity and shear velocity, determining reservoir parameters of subsurface Earth formations including at least density from data obtained from a wellbore penetrating the formations;
   calculating quality factor for the subsurface formations from the velocity, the density and water saturation;
   calculating a synthetic seismogram from the calculated quality factor and from the velocity and density;
   comparing the synthetic seismogram to a seismic survey made in the vicinity of the wellbore;
   adjusting at least one reservoir parameter;
   recalculating the synthetic seismogram; and
   repeating the calculating quality factor, calculating a synthetic seismogram, comparing, adjusting and recalculating until a difference between the synthetic seismogram and the seismic survey falls below a selected threshold.

6. The method of claim 5 further comprising estimating, from the seismic survey, at least one property of the subsurface Earth formations at a different location than the location of the wellbore.

7. The method of claim 6 wherein the at least one property comprises at least one of water saturation, fractional volume of pore space and mineral composition.

8. The method of claim 7 wherein the water saturation is determined using measurements of formation resistivity.

* * * * *